United States Patent
Atkins

(10) Patent No.: US 8,578,267 B2
(45) Date of Patent: Nov. 5, 2013

(54) GRAPHIC ASSEMBLY LAYOUT WITH MAXIMUM PAGE COVERAGE AND MINIMUM CONTENT REMOVAL

(75) Inventor: C. Brian Atkins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2145 days.

(21) Appl. No.: 11/536,556

(22) Filed: Sep. 28, 2006

(65) Prior Publication Data

US 2008/0082912 A1   Apr. 3, 2008

(51) Int. Cl.
*G06F 17/00* (2006.01)

(52) U.S. Cl.
USPC ........................................................ 715/243

(58) Field of Classification Search
USPC .................. 715/243, 273, 244, 245, 246, 247
See application file for complete search history.

(56) References Cited

U.S. PATENT DOCUMENTS

| | | | |
|---|---|---|---|
| 6,301,586 B1 | 10/2001 | Yang et al. | |
| 6,636,648 B2 * | 10/2003 | Loui et al. | 382/284 |
| 6,636,650 B1 | 10/2003 | Long et al. | |
| 6,771,801 B1 | 8/2004 | Fisher et al. | |
| 7,290,006 B2 * | 10/2007 | Xie et al. | 707/102 |
| 7,340,676 B2 * | 3/2008 | Geigel et al. | 715/716 |
| 2002/0048413 A1 | 4/2002 | Kusunoki | |
| 2002/0070982 A1 | 6/2002 | Hill et al. | |
| 2003/0001879 A1 | 1/2003 | Lin et al. | |
| 2005/0071781 A1 | 3/2005 | Atkins | |
| 2005/0071783 A1 | 3/2005 | Atkins | |
| 2006/0103891 A1 | 5/2006 | Atkins | |
| 2006/0150092 A1 | 7/2006 | Atkins | |
| 2006/0200758 A1 | 9/2006 | Atkins | |
| 2006/0209214 A1 | 9/2006 | Fader et al. | |

FOREIGN PATENT DOCUMENTS

| | | |
|---|---|---|
| EP | 1220531 A | 7/2002 |
| EP | 1460557 A | 9/2004 |

* cited by examiner

*Primary Examiner* — Laurie Ries

(57) ABSTRACT

A method for arranging a plurality of graphic elements on a page into a final page layout is described. The method includes identifying a maximum cropping factor (CF) that determines the maximum amount by which a graphic element on the page can be cropped, obtaining a preliminary layout for the graphic elements on the page by, assigning a final area on the page to the preliminary layout, allocating a final area on the page for each graphic element; and fitting each graphic element to its allocated final area.

20 Claims, 9 Drawing Sheets

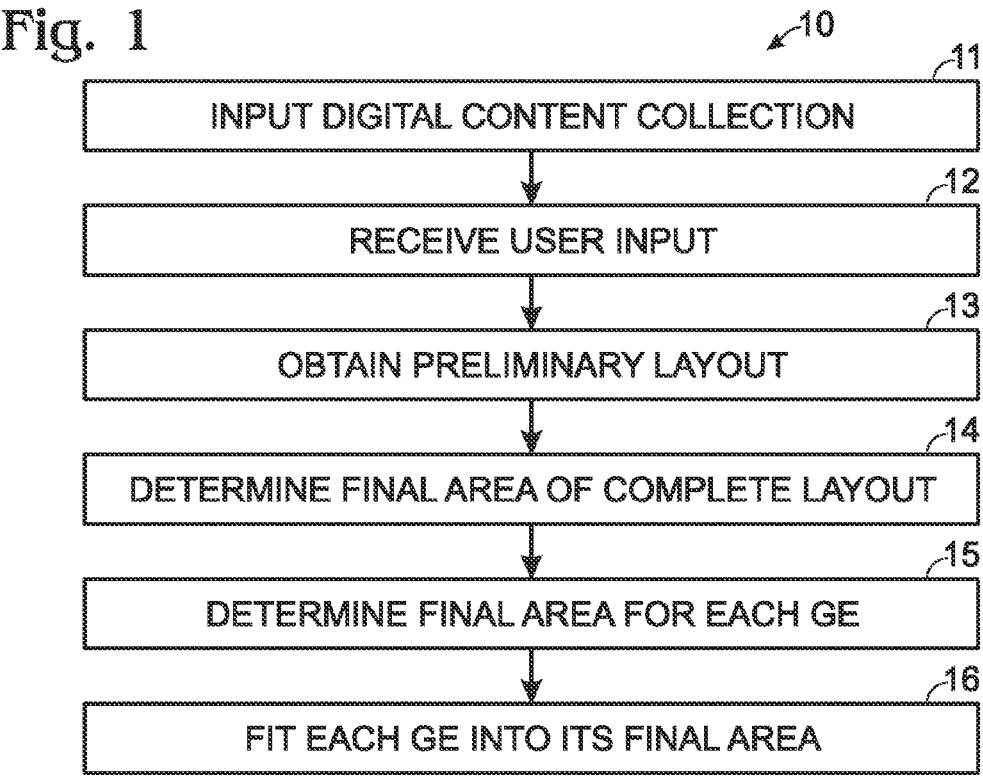
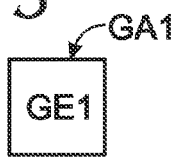
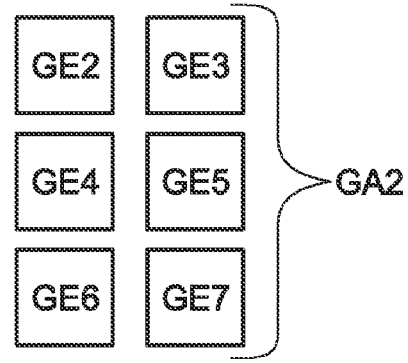
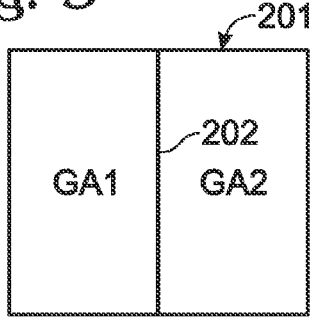
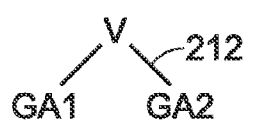

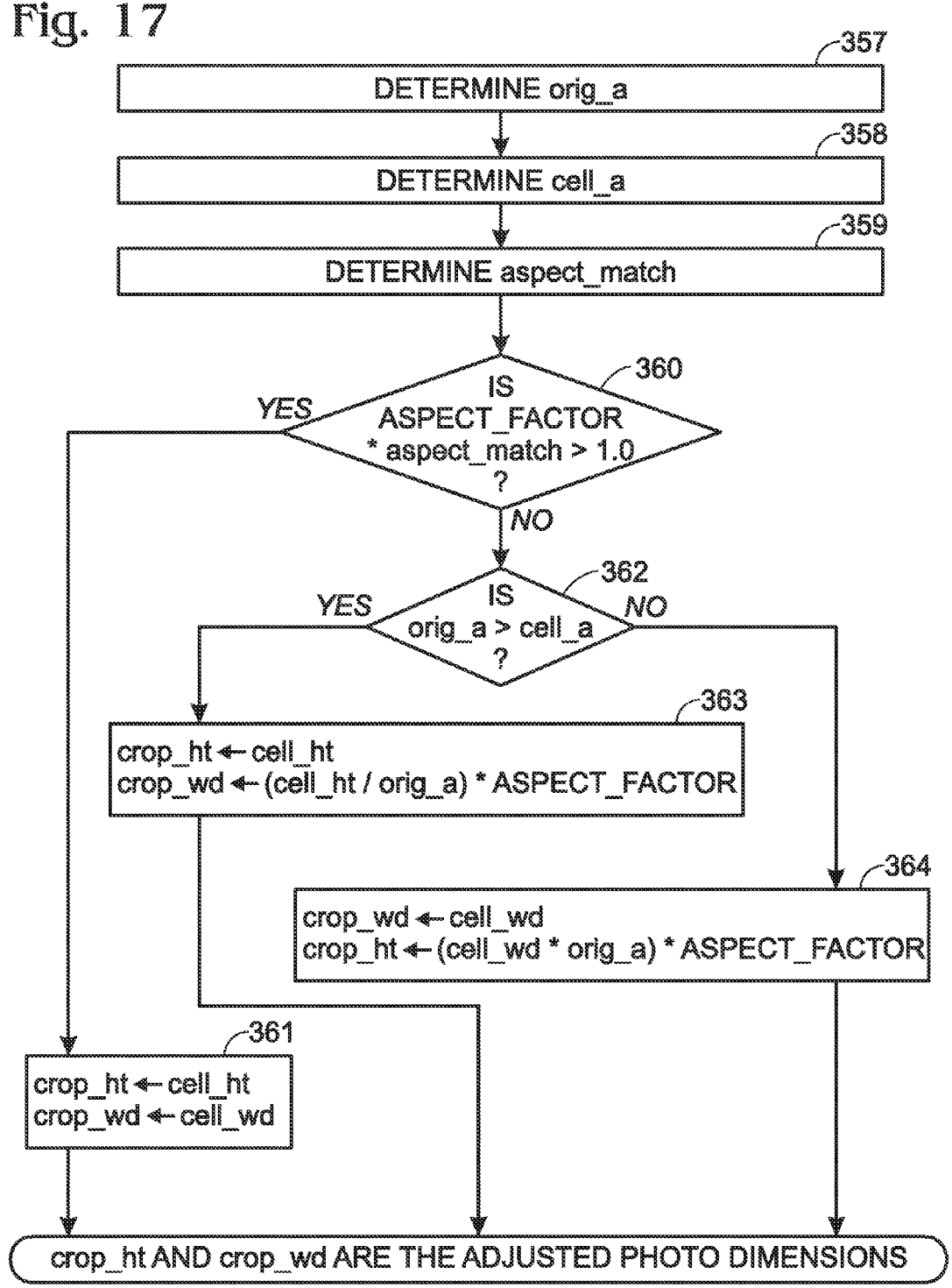

GRAPHIC ASSEMBLY LAYOUT WITH MAXIMUM PAGE COVERAGE AND MINIMUM CONTENT REMOVAL

BACKGROUND

Given the prevalence of digital cameras and home computers, users now frequently create photo collages made up of multiple images laid out on a single page. These photo collages are often made up of images of various sizes. Moreover, a given photo collage may include two or more images which are related and for which it is desirable to maintain a specific sequence (e.g. several key frame images from a video that progressively show a soccer ball being kicked into a goal).

Computer software is currently available for arranging images, such as photographs, video frames, graphic images, and blocks of text, on a page. Such software typically develops what are often called photo albums, comprising one or more pages with images selected by the user and arranged in various manners. A photo album page, as the term is used herein, refers to a page of fixed size having multiple images positioned thereon. A page may be a printed page, or a representation of a page, such as on a computer screen, television, or a projection screen.

Most conventional approaches to photo album layout rely on templates as a means for distributing images on the page. However, the number of possible form factors of printable content is increasing (e.g. panoramas, cropped photos, videos with varying number of keyframes, etc.). As this trend continues, it becomes difficult to provide sets of templates that adequately provide for all possible combinations of differently-shaped images and for all possible user preferences regarding the arrangement of images on the page.

Accordingly, automated software programs have been proposed that appear to position images without using a preconceived template. One example is the "Auto-Collage" function of Fotofusion, a software package available from Lumapix.

When images are positioned on a page, whether or not using a preconceived template, it is often desirable to minimize the amount of empty space on the page.

In the Fotofusion software this appears to be accomplished by first designating a region of the page to each photo, where the regions collectively cover the entire page, and then cropping each photo to make it conform to the specific space requirements of the allotted space. However, the initial set of regions determined by the software appears to be selected arbitrarily. This can often result in significant cropping of the image—leading to overall image quality deterioration, significant content loss, and general user dissatisfaction.

It is therefore desirable to provide a method for placing images on a page in such a way that the amount of the page covered by the images is maximized while the amount of photographic content cropped away is minimized.

BRIEF DESCRIPTION OF THE DRAWINGS

FIG. 1 provides a general overview of one embodiment of a process 10 for generating an image layout.

FIG. 3 provides an example of a graphic assembly comprised of a single graphic element.

FIG. 4 provides an example of a graphic assembly comprised of multiple graphic elements.

FIG. 5 provides an exemplary preliminary page layout for the graphic assemblies of FIGS. 3 and 4.

FIG. 6 provides a binary tree corresponding to the preliminary page layout of FIG. 5.

FIG. 17 provides an exemplary method for computing the adjusted dimensions of a graphic element.

DETAILED DESCRIPTION

Figure 2:
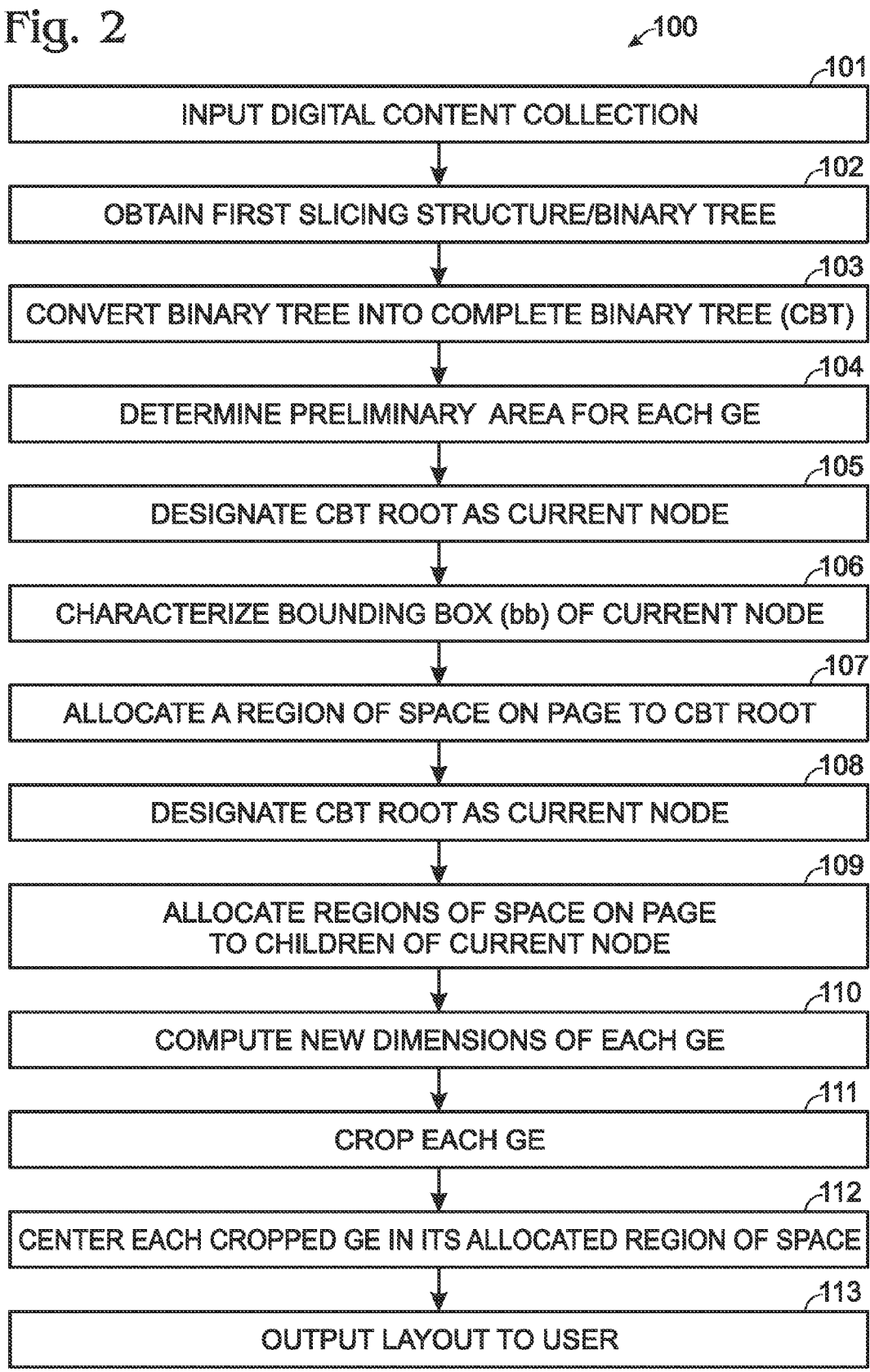
FIG. 2 provides a more detailed overview of one embodiment of a process 100 for generating an image layout.

The present disclosure provides methods and systems for automated placement of multiple images on a page so as to maximize page coverage and minimize content removal.

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

The invention is described herein with respect to graphic assemblies ("GA's") and graphic elements ("GE's"). As used herein, a graphic element is a single image, such as a single photo, a single block of text, a piece of clip-art, a keyframe from a video, etc. As used herein, a graphic assembly is a cohesive group or collection of one or more graphic elements. Graphic assemblies may comprise arbitrary subsets of graphic elements or may comprise sequences of graphic elements. An example of a graphic assembly comprising a sequence of graphic elements is a collection of keyframes from a video, where each keyframe is a graphic element. A graphic assembly having more than one graphic element can be presented in more than one way. However, usually the number of possible presentations is limited. Sequences of graphic elements are typically arranged in rows and columns to preserve the order of the graphic elements. For example, a graphic assembly that includes a sequence of 6 keyframes has 4 possible presentations: a 2×3 array, a 3×2 array, a 1×6 array, and a 6×1 array. A graphic assembly having only one graphic element (such as a single photograph) is a "degenerate" graphic assembly with only one presentation.

For the purposes of the present disclosure, the aspect ratio of a graphic element is defined as the height of the graphic element divided by the width of the graphic element.

FIG. 1 provides a general overview of one embodiment of a process 10 for creating an image layout. The digital content collection to be used is specified by the user, and is input at step 11. The input collection may include photographs, videos, clip-art, blocks of text, or other images. The system may retrieve the input collection from various data sources, including a folder on the user's computer, a digital camera memory card, an on-line photo sharing website, or other similar data sources. The input collection may be in, for example, .pdf, .jpeg, .tif, or other suitable file format.

At step 12, user input is received. The user input may comprise a number of different user preferences related to the final layout of the images including, but not limited to, a maximum cropping factor, the desired spacing between images, and the size of the page on which the final layout is to be placed. The maximum cropping factor (CF) determines the maximum amount of an image that can be cropped by the process. It will be understood that these preferences may be provided by a system designer, manufacturer, or consumer. Accordingly, in this context, the "user" may mean a larger system making use of the present invention; or a system designer setting configuration parameters that govern how this invention will operate in a product; or an end user or consumer making use of the present invention through user interface controls.

At step 13, a preliminary layout is determined. The preliminary layout determines the relative placement of the graphic assemblies on the page and may further provide a preliminary region of space for each graphic element to occupy. For example, a given layout may consist of two graphic assemblies, a first graphic assembly (GA) including two graphic elements (GEa and GEb) and a second graphic assembly (GA') including only a single graphic element (GEe). The preliminary layout may determine that GA is to be placed to the left of GA' and that GEa is to be place above GEb. However, this preliminary layout is not required to give the specific final position and area of each graphic element on the page. Selection of the preliminary layout may take into account criteria that reflect the amount of photographic content that would be cropped away by the present invention.

At step 14, a final area of the complete page layout is determined. In this step, the complete page layout may be thought of as the footprint created by all of the images if they were placed as closely together as possible given any spacing and/or area requirements. According to one embodiment, the process determines if the footprint of the preliminary layout will fit on the page (i.e. if the aspect of the footprint correlates to the aspect of the page). If it will fit, the final area is determined to be the area of the page. If it doesn't fit, the preliminary layout footprint leaves some portion of the page blank, depending on whether the footprint is deficient in the X or Y direction. To compensate for this, the deficient dimension is extended by up to the maximum cropping factor. Depending on amount of the images the process is allowed to crop, this compensation may or may not result in a completely filled page, but in any case, it will result in improved page coverage.

At step 15, the final area of each graphic element is determined in accordance with the extended final area. The region of space assigned to each graphic element is extended in the direction of the deficient dimension from step 14. The magnitude of the extension depends upon ASPECT_FACTOR as in step 14.

In general, after After the graphic element regions are expanded in step 15, they no longer have the same shape as the graphic elements themselves. At step 16, each graphic element is cropped and centered to fit to its allocated final area.

Figure 7:
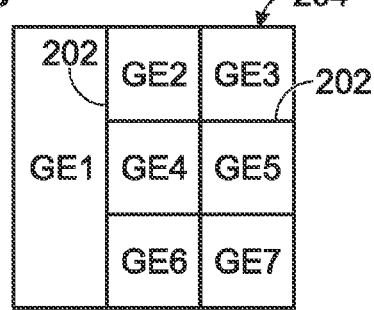
FIG. 7 provides an exemplary preliminary page layout for the graphic elements represented by the graphic assemblies of FIGS. 3 and 4.
Figure 8:
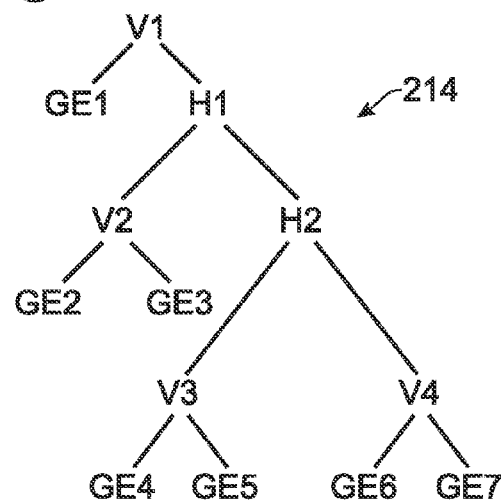
FIG. 8 provides a complete binary tree corresponding to the preliminary page layout of FIG. 7.

FIG. 2 provides a more detailed overview of a process 100 for creating an image layout. At step 101, a digital content collection is input. At step 102, a first slicing structure, or equivalently, the binary tree whose leaves are associated with graphic assembly presentations is obtained. Referring to FIGS. 3-8, a page (201, 204) is divided by one or more horizontal and vertical dividing lines 202 to form a plurality of sub-areas, where each sub-area is associated with a graphic assembly presentation (in 201) or more specifically with a graphic element (in 204) to be placed on the page. As the term is used herein, a page refers to an area of fixed size. A page may be a printed page, or a representation of a page, such as on a computer screen, television, projection screen, etc. The horizontal and vertical lines define a "slicing structure" for the page. When the associated graphic assemblies are placed in their respective sub-areas, a "layout" is created. The slicing structure and a corresponding layout can be represented using a binary tree 210 as illustrated in FIGS. 6 and 8, where components of the tree correspond to features of pages 201 and 204, respectively. The points in the tree that have branches 212 emanating from them are referred to as "internal nodes," while points in the tree that do not have branches emanating from them are referred to as "terminal nodes" or alternatively, "leaves" of the tree 210. Internal nodes and terminal nodes may collectively or individually be referred to simply as "nodes."

As the page is divided sequentially, each internal node represents a horizontal or vertical dividing line or "cut" on the page. In the depicted embodiments, horizontal dividing lines are depicted with a large H while vertical dividing lines are depicted with a large V. Each terminal node is associated with a sub-area and a corresponding graphic assembly. FIG. 5 shows page 201 divided into two sub-areas, representing a single division made from the original page. FIG. 6 is a tree 210 having two terminal nodes, GA1 and GA2.

As shown in FIG. 3, GA 1 is made up of a single graphic element GE1. As seen in FIG. 4, GA2 is made up of six graphic elements, GE2-GE7. It should be appreciated that because GA1 is made up of a single graphic element, GE1, there is only one possible presentation for GA1. However, GA2 is made up of six graphic elements, accordingly a variety of possible presentations are possible. For example, the six images could be presented in a 1×6, 6×1, 2×3, or 3×2 configuration. For ease of explanation, only one possible presentation is depicted. However, it will be understood that a slicing structure and corresponding binary tree could be created for each possible presentation. Moreover, the six graphic elements may or may not need to be presented in a specific order. For ease of description it will be assumed that the order of presentation of the graphic elements within a graphic assembly has been identified either by the user or by some other means.

Returning to FIG. 2, at step 103, the binary tree is converted into a complete binary tree (CBT) wherein each leaf of the tree is associated with a single graphic element. In FIGS. 7 and 8, the graphic assembly-based layout shown in FIG. 5 and its corresponding binary tree (FIG. 6) has been converted into a graphic element-based layout (FIG. 7) and a corresponding complete binary tree 214 (FIG. 8). Accordingly, binary tree 214 is a complete binary tree where GA2 has been converted into a subtree including all of the graphic elements represented by GA2. As used herein, a "subtree" refers to a portion of the tree emanating from a node. Thus, binary tree 214 is a complete binary tree having seven terminal nodes, or leaves, GE1, GE2, GE3, GE4, GE5, GE6 and GE7. Binary tree 214 further includes five internal nodes V1, H1, V2, H2, V3 and V4. Each internal node represents a division, either horizontal (H) or vertical (V) between one or more graphic elements in the layout. The node from which all other nodes emanate is referred to herein as the "root node." In FIGS. 6 and 8, respectively, internal nodes V and V1 represent root nodes.

Again returning to FIG. 2, at 104 a preliminary area for each graphic element is determined. The preliminary area determines how the graphic elements are to be placed on the page relative to one another. The preliminary area may be determined by building and comparing various slicing structures. Different slicing structures can be built depending upon the desires of the user and the images presented. According to one embodiment, multiple slicing structures may be built and an optimal slicing structure selected. Methods for scoring the various slicing structures in order to select the optimal slicing structure are described, for example, in Co-pending U.S. patent application Ser. No. 11/127,326, filed May 12, 2005, and Ser. No. 11/128,543, filed May 13, 2005, each of which is hereby incorporated by reference in its entirety for all purposes.

The preliminary area may be determined, in whole or in part, by input from the user. According to one embodiment, the user may specify the general layout of some or all of the graphic elements on the page. For example, the user may specify that GE1 should be located to the left of GA2. Additionally or alternatively, the user may specify whether any of the images are to be subjected to any area requirements. Area requirements may take the form of relative area requirements (e.g. GE1 must be displayed twice as big as GE2.)

The '326 and '543 applications describe methods for placing images on a page efficiently with a maximum variety of layout possibilities, while at the same time allowing a user to specify that a particular subset of images should be positioned together in a cohesive group and/or specify the exact spacing between adjacent images. Two different types of layouts are described, a "brick style" layout and a "strict area style" layout.

Figure 9:
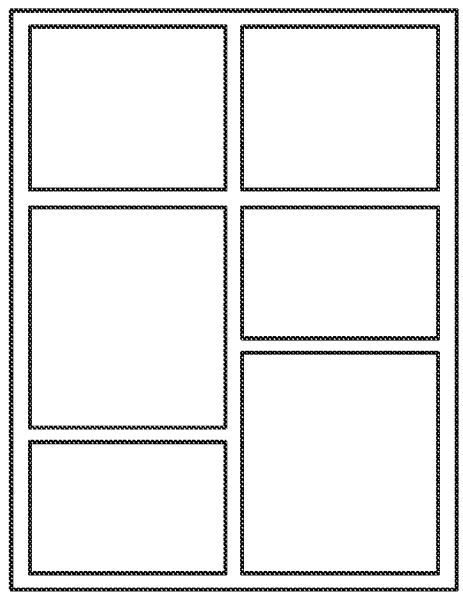
FIG. 9 is an example of a brick style layout.

In the brick style layout, each graphic assembly must be a variable area. When all of the graphic assemblies on a page are variable area, the areas of the graphic assemblies can be manipulated so as to significantly reduce or even eliminate unused space between adjacent graphic elements. In this case, the graphic assemblies fit together, like bricks in a wall. According to one method to achieve this, the area of each graphic assembly is constrained to be the same height or width as its adjacent graphic assemblies. FIG. 9 illustrates a brick style layout.

Figure 10:
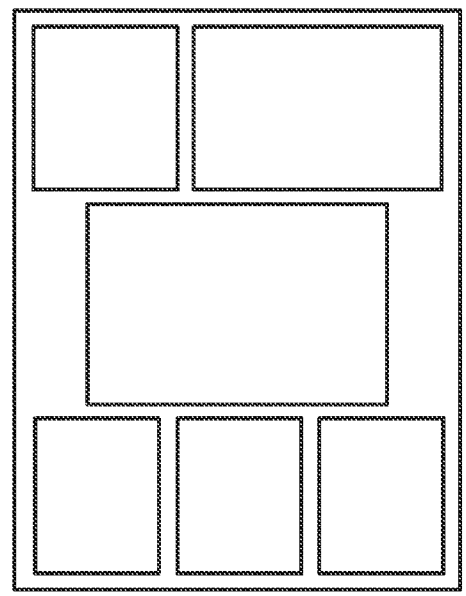
FIG. 10 is an example of a strict area style layout.

The strict area style layout can be used when a user prefers to specify area requirement in order to control the relative proportions of the various images to be shown on the page. In the strict-area style layout any subset of the graphic assemblies used to create the layout can be designating as having fixed areas, meaning that associated images are constrained to be of predetermined areas. When the strict area style layout is used, a user may specify the relative proportion of one graphic assembly to another. For example, a user may specify that a first photograph be displayed twice as big as a second photograph. Alternatively, or additionally, the user may specify that a given graphic assembly must be presented in a given size or with given proportions. FIG. 10 illustrates a strict area style layout.

Returning to FIG. 2, at step 105, the CBT root is designated as the current node. At step 106, a bounding box is characterized for the current node in a recursive process. As will be described in detail, this recursive process also characterizes bounding boxes for all the children of the current node. One implementation of the recursive process of step 106 is described below with respect to FIG. 11. In essence, the recursive process of FIG. 11 works up the binary tree from the terminal leaves to the CBT root to determine the aspect of the footprint created by successively larger bounding boxes, wherein each successively larger bounding box encompasses the children of the next node in the process. In the end, the process is able to determine the aspect of the footprint created by all of the graphic elements when they are placed as close together as possible.

Still referring to FIG. 2, a physical region of space on the page is allocated to the CBT root (step 107). One implementation of step 107 is described below with reference to FIG. 12. In the described implementation, the region allocated to the root node is dependant upon factors referred to as aspect_match and ASPECT_FACTOR. As described in greater detail below, aspect_match is a function of the aspect ratios of the bounding box associated with the root node and the usable area on the page. ASPECT_FACTOR may be user-specified and corresponds to the maximum amount that a given graphic element can be cropped in the final layout. Accordingly, ASPECT_FACTOR is one example of a cropping factor (CF).

Referring again to FIG. 2, at step 108, the CBT root is again designated as the current node and the regions of space are recursively allocated to children of the current node (step 109). One implementation of step 109 is described below with respect to FIGS. 13 through 16. Briefly, the process described in FIG. 13 works from the top of the tree (i.e. the root node) down to the leaves allocating a region of space on the page to each successively smaller bounding box (determined in the process shown in FIG. 12) based on the size of the available region of space and the size of the current bounding box.

At step 110, adjusted dimensions are computed for each graphic element based on the corresponding allocated region of space and based on aspect_match. One implementation of step 110 is described below with respect to FIG. 17. At step 111, for each graphic element, a cropped graphic element is computed in accordance with the adjusted dimensions. At step 112, each cropped graphic element is centered in its allocated region of space. At step 113, the layout is output to the user.

Figure 11:
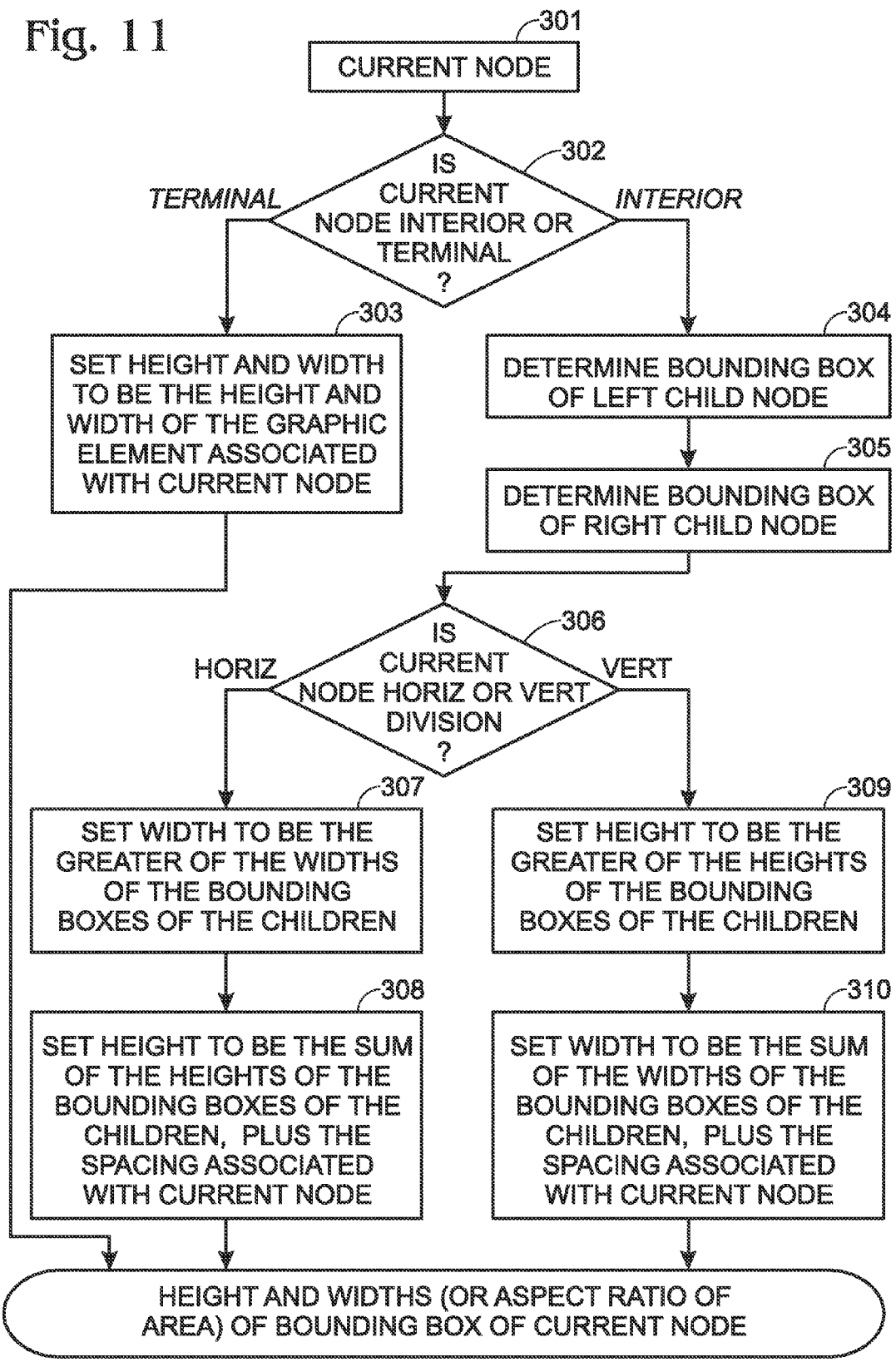
FIG. 11 provides an exemplary recursive process for characterizing a bounding box for a current node.

Referring to FIG. 11, for each interior node in the tree, a bounding box is determined that encloses the graphic elements and fixed spacing between the graphic elements by submitting the current node (block 301) to a recursive process. In the recursive process, the current node is determined to be either a terminal node or an interior node (block 302). If the current node is a terminal node, a bounding box is established that has the height and width of the associated graphic element (block 303). If the current node is an interior node, the two child nodes of the current node, that is the left child node (block 304) and the right child node (block 305), are sequentially designated as the current node and submitted to the same recursive process.

Referring to FIGS. 8 and 11 simultaneously, because V1 is the root of the CBT of FIG. 8, V1 would initially be designated as the current node. V1 is not a terminal node, so the process moves to the left child node of V1, which is GE1. GE1 is a terminal node, so the process moves to block 303, where the height and width of the bounding box is set to the height and width of GE1. The process next moves to the right child of node V1, which is H1. H1 is not a terminal node, so the process moves to the left child node of H1, which is V2. V2 is not a terminal node, so the process moves to the left child node of V2, GE2. GE2 is a terminal node. Accordingly, the process moves to block 303 and the height and width of the bounding box is set to be the height and width of GE2. The process now moves to the right child node of V2, GE3. GE3 is also a terminal node. Accordingly, the process moves to block 303 and the height and width of the bounding box is set to be the height and width of GE3. The bounding boxes for the left and right child nodes of V2 have now been determined, so the process moves to block 306.

At 306, the process determines whether the current node is a horizontal or vertical division. In this case, V2 is a vertical division, so the process moves to block 309 in order to draw a bounding box that encompasses GE2 and GE3. At block 309, the height of the GE2/GE3 bounding box is set to be the greater of the heights of the bounding boxes of GE2 and GE3. At block 310, the width of the GE2/GE3 bounding box is set to be the sum of the widths of the bounding boxes of GE2 and GE3 plus any spacing associated with the current node.

Had the division been a horizontal division, the process would have moved to block 307, where the width of the bounding box around both child nodes would have been set to be equal to the greater of the widths of the bounding boxes of the child nodes. The process then would have moved on to block 308, where the height of the bounding box around both child nodes would have been set to the sum of the heights of the bounding boxes around each of the child nodes plus the spacing associated with the current node.

After determining the size of the bounding box around the two child nodes, the process then moves back up to H1 and down to the right child node of H1, which is H2. H2 is not a terminal node, so the process moves to the left child node of H2, which is V3. V3 is not a terminal node, so the process moves to the left child node of V3, which is GE4. GE4 is a terminal node, so the GE4 bounding box is set to be the height and width of GE4. The process continues in this manner, drawing bounding boxes around GE5 and then GE4+GE5, then GE6, then GE7, then GE6+GE7, then ((GE4+GE5)+(GE6+GE7)), then (((GE4+GE5)+(GE6+GE7))+(GE2+GE3)) and finally ((((GE4+GE5)+(GE6+GE7))+(GE2+GE3))+GE1). At this point, the bounding box for the entire root node is computed.

Figure 12:
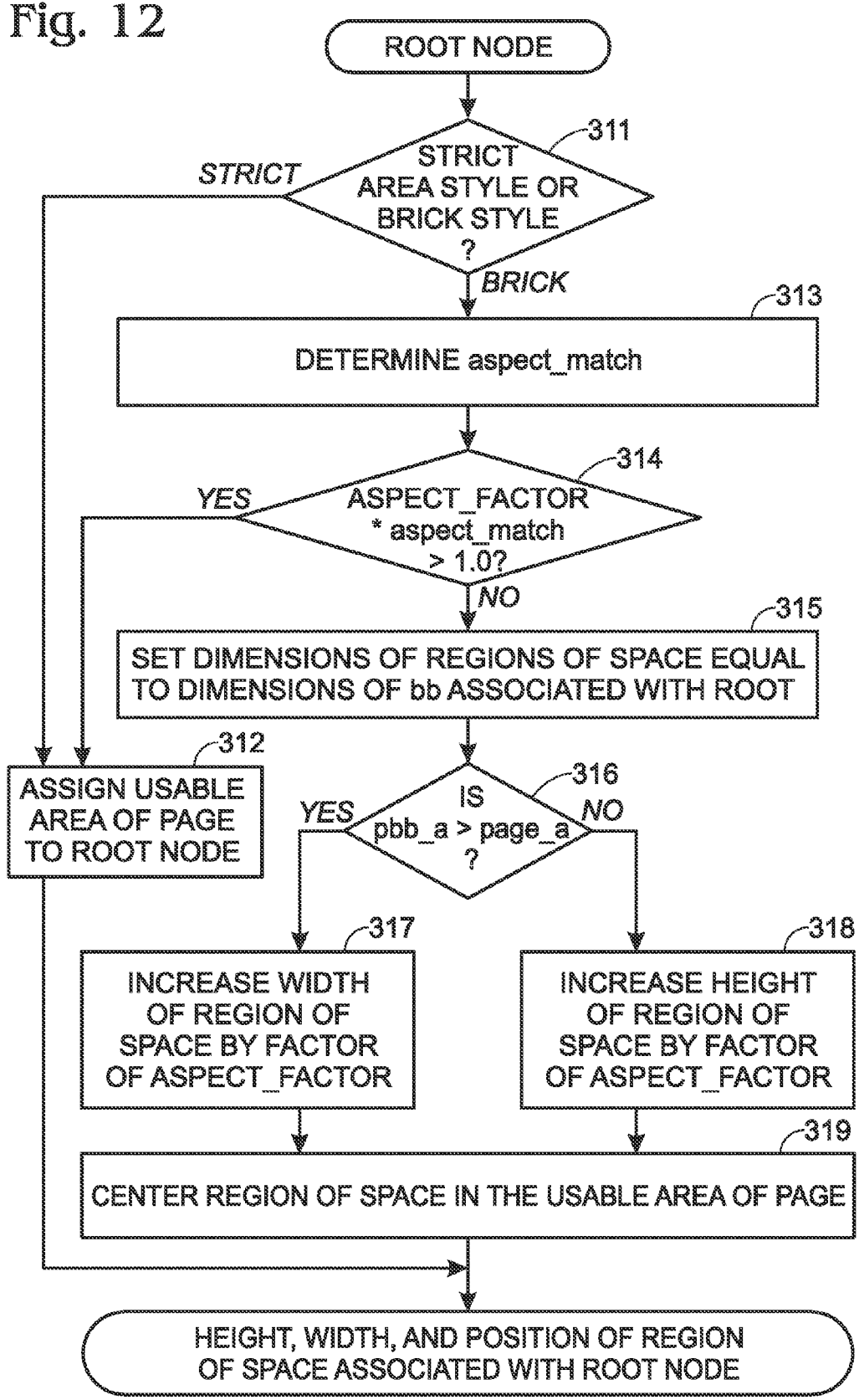
FIG. 12 provides an exemplary method for assigning a region of space to a root node.

Referring to FIG. 12, a physical region of space on the page is allocated to the CBT root. According to one embodiment, this process uses a control parameter called ASPECT_FACTOR, which dictates the maximum allowable amount of cropping. The value of ASPECT_FACTOR may, for example, be determined by the user. For example a user may specify that, at most, only 5%, 10%, 25%, etc. of any graphic element may be cropped.

The value of ASPECT_FACTOR must be greater than or equal to 1.0. The greater the value of ASPECT_FACTOR, the more cropping the process is allowed to impart to the graphic elements. Put another way, the greater the value of ASPECT_FACTOR, the more content the process is permitted to crop away.

Accordingly, if ASPECT_FACTOR has a value x, and the aspect ratio of any input photo is a, the cropped graphic element will have an aspect ratio anywhere in the following interval: [x/a, x*a]. A value of 1.0 dictates that photos will not be cropped at all; and a value of 2.0 dictates that up to half of any given graphic element may be cropped away. A value of 3.0 dictates that up to two-thirds of any given photo may be cropped away, and so on. According to some embodiments, a reasonable range of values for ASPECT_FACTOR may be anywhere between 1.0 and 4.0. Accordingly, a user may specify a percentage, ratio, or other value representing the amount of a graphic element that the user will allow the process to crop and the value specified by the user can be converted to the appropriate ASPECT_FACTOR value.

Still referring to FIG. 12, the process depends upon the layout style. At block 311 the process determines if the layout is strict area style or brick style. If the layout is strict area style, the entire usable area of the page is assigned to the root node (block 312). If the layout is brick style, the process moves to block 313.

At block 313, a value for aspect_match is calculated. The principle bounding box aspect ratio (pbb_a) is set to the aspect ratio of the bounding box associated with the root node, the page aspect ratio (page_a) is set to the aspect ratio of the usable area on the page, and aspect_match is set to min {pbb_a, page_a}/max {pbb_a, page_a}. Accordingly, aspect_match will be a number between 0 and 1.

At block 314, the process determines if ASPECT_FACTOR*aspect_match is greater than 1.0. If it is, the value of ASPECT_FACTOR allows more than enough cropping to fill the page completely and the process moves to block 312, where the entire usable area of the page is assigned to the root node.

On the other hand, if ASPECT_FACTOR*aspect_match is not greater than 1.0, the process moves to block 315. At 315, the dimensions of the region of space are set to the dimensions of the bounding box associated with the root. At 316, the process determines if pbb_a is greater than page_a. If pbb_a is greater than page_a, the width of the region of space on the page is increased by a factor of ASPECT_FACTOR (block 317). If pbb_a is less than page_a the height of the region of space on the page is increased by a factor of ASPECT_FACTOR. At this point, the dimensions of the region of space are computed, and it remains to determine the position relative to the usable area on the page. This is accomplished at block 319, where the region of the space on the page is centered in the usable area of the page.

Figure 13:
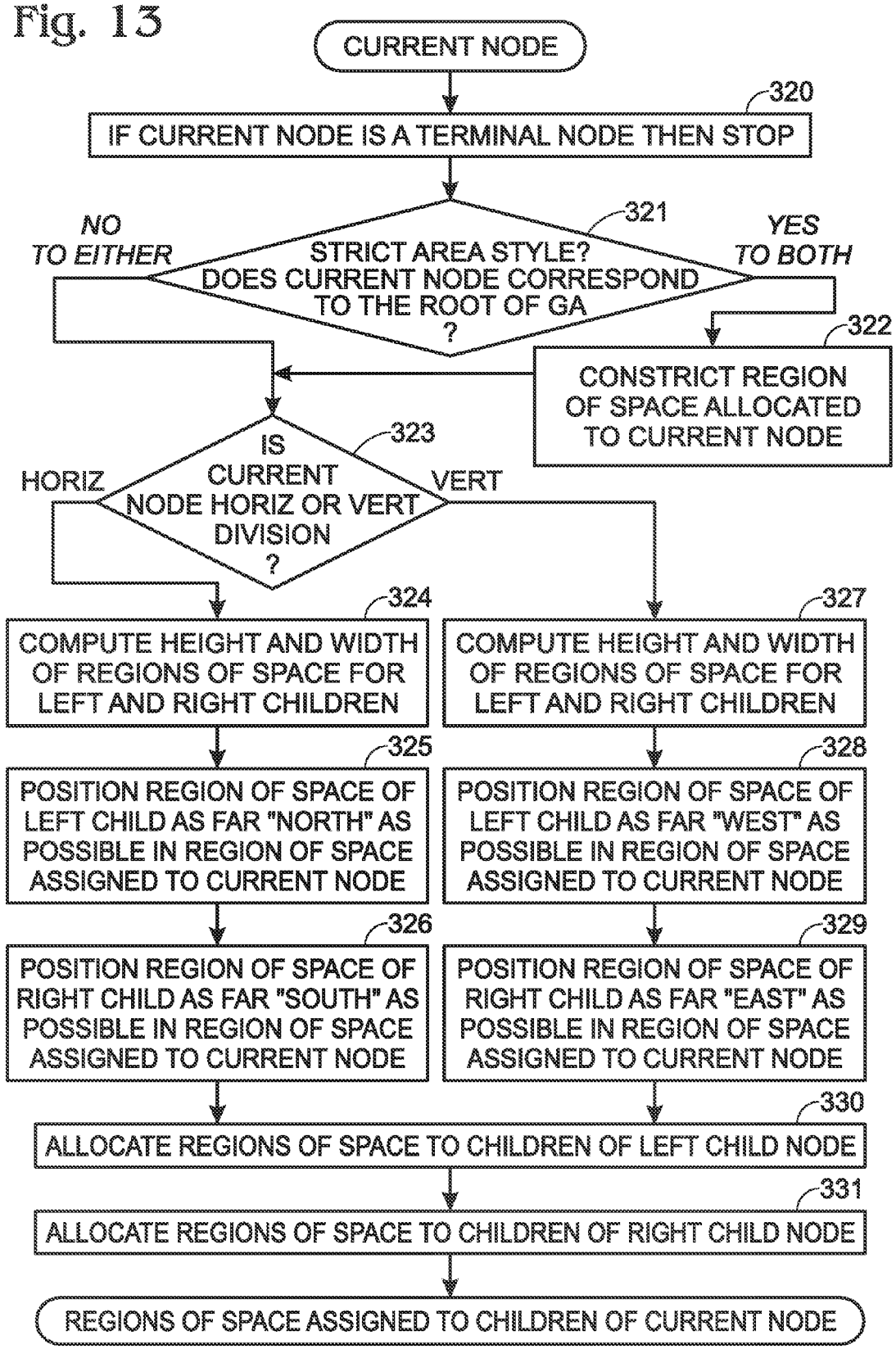
FIG. 13 provides an exemplary method for allocating regions of space to the children of a node.

Referring to FIG. 13, regions of space on the page are allocated to the children of the root node in a recursive process. Initially, the process determines if the current node is a terminal node (block 320). If the node is a terminal node, there are no children of the root node to which regions of space need to be allocated and this process can be skipped. If however, the node is not a terminal node then the process determines (block 321) if the layout style is strict area and/or if the current node in the CBT corresponds to the root of a graphic assembly having multiple graphic elements that should be separated by a precise distance.

If the layout is brick style or if the current node does not correspond to the root of a graphic assembly having multiple graphic elements that should be separated by a precise distance, the process proceeds directly to block 323. However, if the layout is strict area style and the current node in the CBT corresponds to the root of a graphic assembly having multiple graphic elements that should be separated by a precise distance, a region of space allocated to the current node is constricted (block 322). The purpose of this constriction is to position the graphic elements together tightly, to convey an intended visual association. For example, consider a strict area layout where the space between adjacent graphic assemblies is constrained to be at least 0.5 inches. If one of the graphic assemblies is a sequence of video keyframes, then it may be desirable to specify that the graphic elements (of that graphic assembly) be separated by some smaller distance, say 0.2 inches, to convey the visual cue that the keyframes form a cohesive set. An implementation of this step is described below with respect to FIG. 14.

At block 323, the process determines if the current node represents a horizontal division or a vertical division. If it is a horizontal division, the process proceeds to block 324. If it is a vertical division, the process proceeds to block 327.

At block 324, the height and width of the regions of space are computed for the left and right children. One implementation for this process is described below with respect to FIG.

15. Then, the region of space of the left child is positioned as far "north" as possible in the region of space assigned to the current node (block 325) Similarly the region of space of the right child is positioned as far "south" as possible in the region of space assigned to the current node (block 326).

At block 327, the height and width of the regions of space for the left and right children is computed. One implementation of this process is described below with respect to FIG. 16. Then, the region of space of the left child is positioned as far "west" as possible in the region of space assigned to the current node (block 328) and the region of space of the right child is positioned as far "east" as possible in the region of space assigned to the current node (block 329).

The processes described above are repeated recursively to allocate regions of space to children of the left child node (block 330) and right child node (block 331) until regions of space have been assigned to all nodes in the tree.

Figure 14:
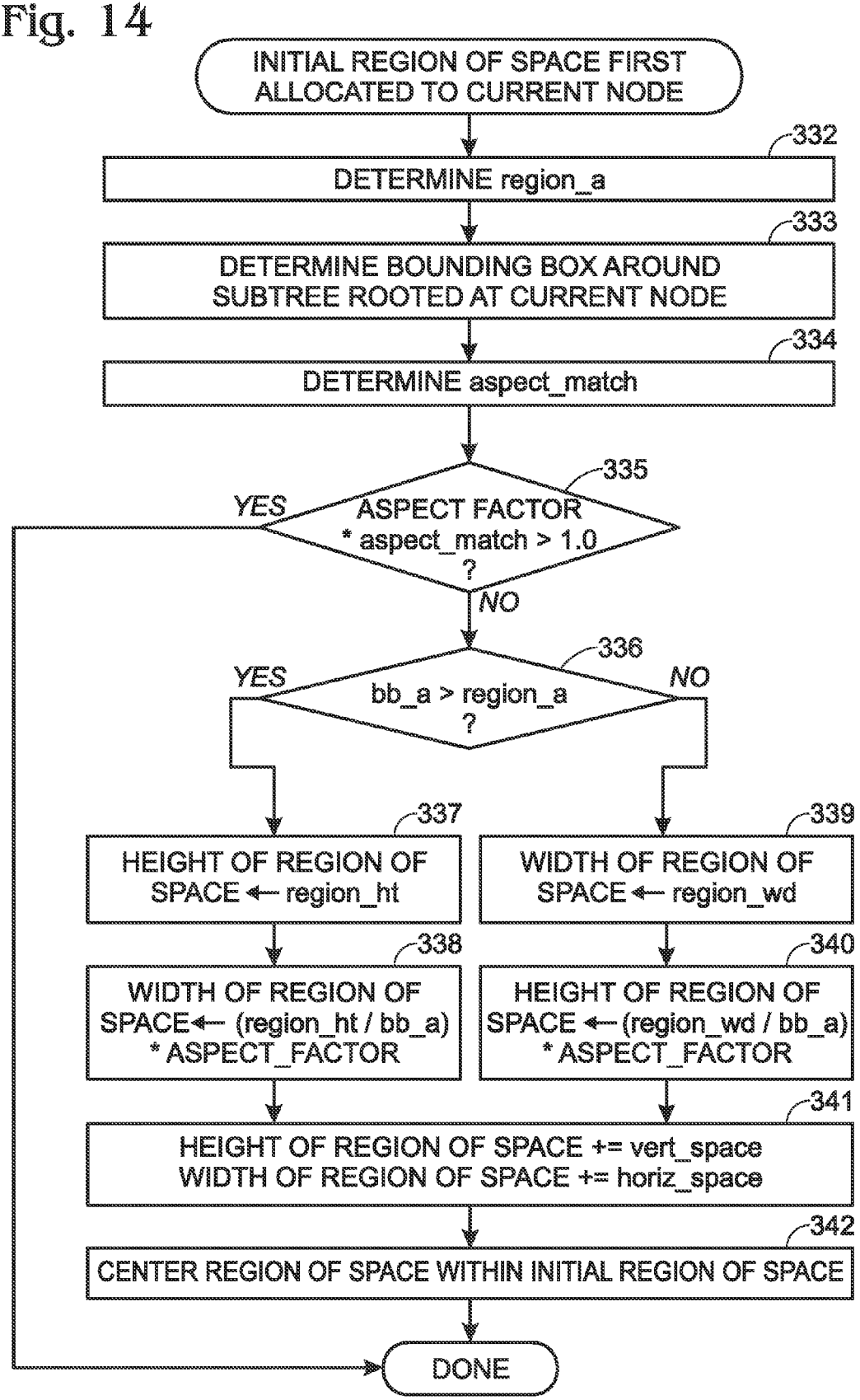
FIG. 14 provides an exemplary method for constricting a region of space allocated to a current node.

Referring to FIG. 14, an initial region of space is allocated to a current node. At 332, the aspect ratio of the initial region of space (region_a) is determined. According to one embodiment, the aspect ratio of the initial region of space is determined by subtracting the amount of blank space that will be devoted to inter-element spacing from the total amount of space available for the graphic elements. Accordingly, in the example where the current node is associated with a graphic assembly comprising a sequence of video keyframes, region_a is based on the number of rows and columns into which the graphic elements are to be arranged and the desired spacing between the two graphic elements (INTRA_GA_SPACING). In the current embodiment, it is assumed that the desired spacing between the two graphic elements is constant across the entire graphic assembly corresponding to the current node.

Accordingly, continuing with the example where the current node is associated with a graphic assembly comprising a sequence of video keyframes, vert_space is set to:

INTRA_GA_SPACING * (num_rows − 1) and
horiz_space is set to:
  INTRA_GA_SPACING * (num_cols − 1).
Then, region_ht is set to:
  (height of the initial region of space) − (vert_space) and
region_wd is set to:
  (width of the intial region of space) − (horiz_space).
Finally, region_a is determined to be:
  region_ht / region_wd.

At 333, the bounding box around the subtree rooted at the current node is determined, assuming the spacing associated with all nodes is zero. This bounding box can be determined by submitting the current node to the process of FIG. 11, with the interior node spacings (mentioned in blocks 308 and 310) temporarily set to zero.

At 334 aspect_match is calculated. According to one embodiment, aspect_match is determined to be:

min {bb_a, region_a} / max {bb_a, region_a} where bb_a is the aspect ratio of the bounding box in block 333.

At block 335, the process determines whether ASPECT_FACTOR*aspect_match is greater than 1.0. If ASPECT_FACTOR*aspect_match is greater than 1, the value of ASPECT_FACTOR allows for more than enough cropping, so the region of space is not constricted. If ASPECT_FACTOR*aspect_match is not greater than 1, the process determines if bb_a is greater than region_a (block 336).

If bb_a is greater than region_a then the height of the region of space is determined to be region_ht (block 337) and the width of the region of space is determined to be:

(region_ht/bb_a) * ASPECT_FACTOR (block 338).

If bb_a is not greater than region_a, the width of the region of space is determined to be region_wd (block 339) and the height of the region of space is determined to be:

(region_wd * bb_a) * ASPECT_FACTOR (block 340).

At block 341, the height of the region of space is augmented by adding back vert_space, and the width of the region of space is augmented by adding back horiz_space. At block 342, the position of the region of space is determined by centering the region of space in the initial region of space.

Figure 15:
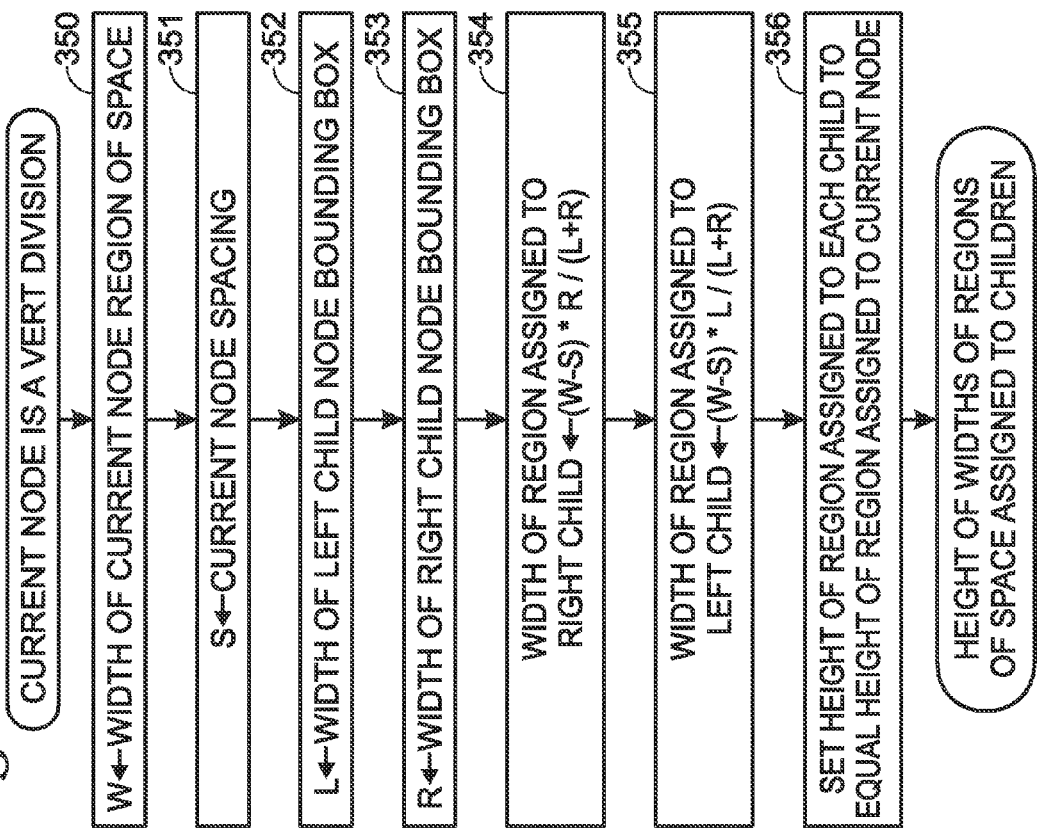
FIG. 15 provides an exemplary method for computing the height and width of regions of space for the left and right hand children of a node representing a horizontal division.
Figure 16:
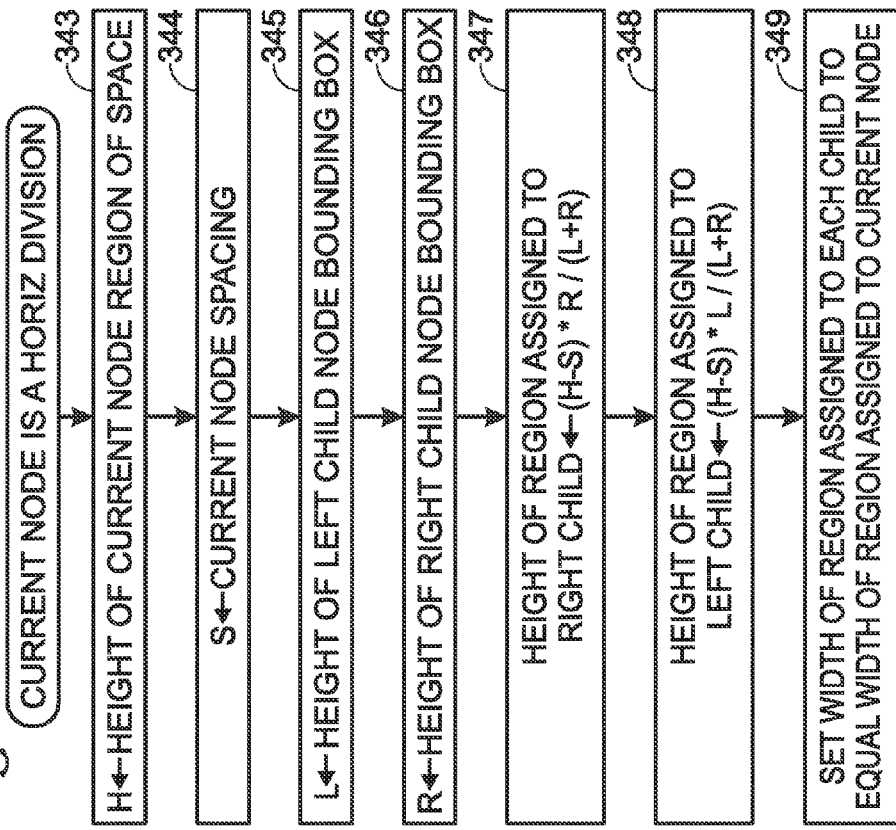
FIG. 16 provides an exemplary method for computing the height and width of regions of space for the left and right hand children of a node representing a vertical division.

In the method described with respect to FIGS. 15 and 16, the proportion of space to allocate to each graphic assembly given the required spacing between the graphic assemblies is determined. Referring first to FIG. 15, a method for computing the height and width of regions of space for left and right hand children when the current node is a horizontal division is shown. At 343, H is determined to be the height of the current node region of space. At 344, S is determined to be the current node spacing. At 345, L is determined to be the height of the left child node bounding box. At 346, R is determined to be the height of the right child node bounding box. At 347, the height of the region assigned to the right child is determined to be (H−S)*R/(L+R). At 348, the height of the region assigned to the left child is determined to be (H−S)*L/(L+R). At 349, the width of the region assigned to each child is set to equal the width of the region assigned to the current node.

Turning next to FIG. 16, a method for computing the height and width of regions of space for left and right hand children when the current node is a vertical division is shown. At 350, W is determined to be the width of the current node region of space. At 351, S is determined to be the current node spacing. At 352, L is determined to be the width of the left child node bounding box. At 353, R is determined to be the width of the right child node bounding box. At 354, the width of the region assigned to the right child is determined to be (W−S)*R/(L+R). At 355, the width of the region assigned to the left child is determined to be (W−S)*L/(L+R). At 356, the height of the region assigned to each child is set to equal the height of the region assigned to the current node.

Referring to FIG. 17, adjusted graphic element dimensions are computed. At 357, the original aspect ratio of an un-cropped graphic element is determined. According to one embodiment, the original aspect ratio (orig_a) is determined to be orig_ht/orig_wd where orig_ht is the height of the un-cropped graphic element from the preliminary area and orig_wd is the width of the un-cropped graphic element from the preliminary area.

At 358, a cell aspect ratio (cell_a) is determined. According to one embodiment, cell_a is determined to be cell_ht/cell_wd where cell_ht is the height of the region of space allocated to the terminal node corresponding to the graphic element and cell_wd is the width of the region of space allocated to the terminal node corresponding to the graphic element. At 359, aspect_match is determined to be:

$$\min\{orig\_a, cell\_a\} / \max\{orig\_a, cell\_a\}.$$

At 360, the process determines if ASPECT_FACTOR*aspect_match is greater than 1.0. If ASPECT_FACTOR*aspect_match is greater than 1.0, the value of ASPECT_FACTOR allows for more than enough cropping, so the cropped photo should fill the cell completely and the cropped height of the graphic element (crop_ht) is determined to be the cell_ht and cropped width (crop_wd) of the graphic element is determined to be the cell_wd (block 361).

If ASPECT_FACTOR*aspect_match is not greater than 1.0, the process proceeds to block 362 and determines if orig_a is greater than cell_a. If orig_a is greater than cell_a, then crop_ht is determined to be cell_ht and crop_wd is determined to be (cell_ht/orig_a)*ASPECT FACTOR (block 363). If orig_a is not greater than cell_a, then crop_wd is determined to be cell_wd and crop_ht is determined to be (cell_wd*orig_a)*ASPECT FACTOR (block 364).

The foregoing description affords the ability to develop a visually pleasing layout that maximizes page coverage and minimizes content removal, while allowing the user to have ultimate control over the maximum amount of content removed.

While the invention has been described with reference to the exemplary embodiments thereof, those skilled in the art will be able to make various modifications to the described embodiments without departing form the true spirit and scope of the disclosure. Accordingly, the terms and descriptions used herein are set forth by way of illustration only and are not meant as limitations.

What is claimed is:

1. A method for arranging a plurality of graphic elements into a final page layout on a page, the method comprising:
    identifying a maximum cropping factor (CF) that determines the maximum amount by which a graphic element on the page can be cropped;
    obtaining a preliminary layout for the graphic elements on the page by:
        assigning a general region on the page for each graphic element relative to the other graphic elements on the page; and
        assigning a preliminary area for each graphic element;
    assigning a final area on the page to the preliminary layout;
    allocating a final area on the page for each graphic element; and
    fitting each graphic element to its allocated final area by:
        cropping each graphic element by no more than CF; and
        centering each cropped graphic element in the allocated final area such that a maximum amount of the final area is covered by the graphic element.

2. The method of claim 1 wherein CF is user-specified.

3. The method of claim 1, further comprising identifying a spacing factor that identifies the amount of space to be maintained between graphic elements.

4. The method of claim 1 further comprising obtaining a complete binary tree (CBT) corresponding to the preliminary layout, wherein the CBT comprises:
    a root node; and
    at least one terminal node emanating from the root node, wherein each terminal node corresponds to a graphic element in the preliminary layout.

5. The method of claim 4 wherein assigning a final area on the page to the preliminary layout comprises designating a principle bounding box (pBB) for the preliminary layout by recursively characterizing bounding boxes around each node in the CBT.

6. The method of claim 5 wherein assigning a final area on the page to the preliminary layout further comprises determining if the value of CF is sufficient to allow for the usable area on the page to be filled.

7. The method of claim 6 wherein if the cropping factor is sufficient to allow for the usable area on the page to be filled, the method further comprises setting the dimensions of the final area equal to the dimensions of the usable area on the page.

8. The method of claim 6 wherein, if the cropping factor is not sufficient to allow for the usable area on the page to be filled, the method further comprises:
    setting the dimensions of the final area equal to the dimensions of the pBB; and
    extending the deficient dimension of the final area by CF.

9. The method of claim 6 further comprising:
    determining whether the current node represents a horizontal or vertical division;
    if the current node represents a horizontal division:
        computing the height and width of the final area on the page for the left and right children;
        positioning the final area for the left child as far north as possible in the region of space assigned to the current node; and
        positioning the final area for the right child as far south as possible in the region of space assigned to the current node; and
    if the current node represents a vertical division:
        computing the height and width of the final area on the page for the left and right children;
        positioning the final area for the left child as far west as possible in the region of space assigned to the current node; and
        positioning the final area for the right child as far east as possible in the region of space assigned to the current node.

10. A method for providing a layout of graphic elements on a page, the method comprising:
    preliminarily positioning the graphic elements on the page so as to maximize page coverage, given the original aspect of each graphic element;
    identifying the maximum amount of each graphic element that can be cropped;
    cropping each graphic element by no more than the maximum amount; and
    increasing the dimensions of each graphic element so as to maximize page coverage.

11. The method of claim 10 further comprising maintaining a predetermined amount of spacing between each of the graphic elements.

12. The method of claim 10 wherein at least one of the graphic elements is constrained to be of a predetermined relative area.

13. The method of claim 9 wherein at least two of the graphic elements comprise a graphic assembly and wherein the graphic elements in the graphic assembly must be presented adjacent to one another in the layout.

14. A computer-readable medium storing computer-executable instructions for performing a method for arranging a set of graphic assemblies in an area on a page, the instructions being adapted to be executed by a computer to perform operations comprising:

identifying a maximum cropping factor (CF) that determines the maximum amount by which any graphic element on the page can be cropped;

obtaining a preliminary layout for the graphic elements on the page by:

assigning a general region on the page for each graphic element relative to the other graphic elements on the page; and assigning a preliminary area for each graphic element;

assigning a final area on the page to the preliminary layout;

allocating a final area on the page for each graphic element; and fitting each graphic element to its allocated final area by:

cropping each graphic element by no more than CF; and centering each cropped graphic element in the allocated final area such that a maximum amount of the final area is covered by the graphic element.

15. The computer-readable medium of claim 14, wherein the computer-executable instructions further cause the computer to perform operations comprising receiving the CF from a user.

16. The computer-readable medium of claim 14, wherein the computer-executable instructions further cause the computer to perform operations comprising:

obtaining a complete binary tree (CBT) corresponding to the preliminary layout, wherein the CBT comprises:

a root node; and at least one terminal node emanating from the root node, wherein each terminal node corresponds to a graphic element in the preliminary layout; and assigning a final area on the page to the preliminary layout by designating a principle bounding box (pBB) for the preliminary layout by recursively characterizing bounding boxes around each node in the CBT.

17. The computer-readable medium of claim 14, wherein the computer-executable instructions further cause the computer to perform operations comprising assigning a final area on the page to the preliminary layout by determining if the value of CF is sufficient to allow for the usable area on the page to be filled.

18. The computer-readable medium of claim 17, wherein, if the cropping factor is not sufficient to allow for the usable area on the page to be filled, the instructions further cause the computer to perform operations comprising:

setting the dimensions of the final area equal to the dimensions of the pBB; and extending the deficient dimension of the final area by CF.

19. The computer-readable medium of claim 17, wherein, if the cropping factor is sufficient to allow for the usable area on the page to be filled, the instructions further cause the computer to perform operations comprising setting the dimensions of the final area equal to the dimensions of the usable area on the page.

20. The computer-readable medium of claim 14, wherein, when executed by the computer, the computer-executable instructions cause the computer to perform operations further comprising:

determining whether the current node represents a horizontal or vertical division;

if the current node represents a horizontal division:

computing the height and width of the final area on the page for the left and right children;

positioning the final area for the left child as far north as possible in the region of space assigned to the current node; and positioning the final area for the right child as far south as possible in the region of space assigned to the current node; and if the current node represents a vertical division:

computing the height and width of the final area on the page for the left and right children;

positioning the final area for the left child as far west as possible in the region of space assigned to the current node; and positioning the final area for the right child as far east as possible in the region of space assigned to the current node.

\* \* \* \* \*